US010325519B2

(12) United States Patent
Tan et al.

(10) Patent No.: US 10,325,519 B2
(45) Date of Patent: Jun. 18, 2019

(54) VEHICLE TUTORIAL SYSTEM AND METHOD FOR SENDING VEHICLE TUTORIAL TO TUTORIAL MANAGER DEVICE

(71) Applicant: Nissan North America, Inc., Franklin, TN (US)

(72) Inventors: Adrian Tan, Northville, MI (US); Ching Pin Chang, Sunnyvale, CA (US); Toshiro Muramatsu, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 141 days.

(21) Appl. No.: 15/365,651

(22) Filed: Nov. 30, 2016

(65) Prior Publication Data

US 2018/0151088 A1    May 31, 2018

(51) Int. Cl.
| | | |
|---|---|---|
| *G09B 19/16* | (2006.01) | |
| *G06K 9/00* | (2006.01) | |
| *G07C 5/00* | (2006.01) | |
| *G09B 5/06* | (2006.01) | |
| *H04L 29/08* | (2006.01) | |

(52) U.S. Cl.
CPC ....... *G09B 19/167* (2013.01); *G06K 9/00845* (2013.01); *G07C 5/008* (2013.01); *G09B 5/06* (2013.01); *H04L 67/12* (2013.01)

(58) Field of Classification Search
CPC .... G09B 19/167; G09B 5/06; G06K 9/00845; G07C 5/008; H04L 67/12
See application file for complete search history.

(56) References Cited

U.S. PATENT DOCUMENTS

| | | |
|---|---|---|
| 5,321,602 A | 6/1994 | Francisco |
| 6,227,862 B1 | 5/2001 | Harkness |
| 6,373,148 B1 * | 4/2002 | Daiss ............... B60K 28/02 |
| | | 307/10.1 |
| 7,327,986 B2 | 2/2008 | True et al. |
| (Continued) | | |

FOREIGN PATENT DOCUMENTS

WO    2014042571 A1    3/2014

OTHER PUBLICATIONS

International Search Report in PCT/JP2017/022964 dated May 31, 2017.

*Primary Examiner* — Corbett B Coburn
(74) *Attorney, Agent, or Firm* — Global IP Counselors, LLP

(57) ABSTRACT

A vehicle tutorial system includes a data storage device having at least one vehicle tutorial, an on-board identification sensor, an on-board vehicle communication device, a tutorial manager device located in a cloud computer and/or the remote device, and an on-board vehicle controller. The on-board vehicle controller is programmed to identify the user of the vehicle based on information from the on-board identification sensor, select the vehicle tutorial, select the remote device associated with the user of the vehicle, offer the vehicle tutorial to the user at a first time, and upon the user declining the offer at the first time, send the vehicle tutorial to the tutorial manager device. The tutorial manager device includes a processor programmed to offer the vehicle tutorial to the user at a time later than the first time on the on-board vehicle display or on the remote device.

26 Claims, 7 Drawing Sheets

(56) References Cited

U.S. PATENT DOCUMENTS

| | | |
|---|---|---|
| 8,108,098 B2 | 1/2012 | Childress et al. |
| 8,694,203 B2 | 4/2014 | Chen et al. |
| 9,244,650 B2 | 1/2016 | Platz et al. |
| 2009/0042175 A1 | 2/2009 | Zorda et al. |
| 2010/0070932 A1 | 3/2010 | Hur |
| 2014/0240349 A1* | 8/2014 | Tuukkanen ........... G06F 3/0484 345/633 |
| 2015/0262484 A1* | 9/2015 | Victor ................... G09B 19/16 701/1 |
| 2016/0039429 A1 | 2/2016 | Abou-Nasr et al. |
| 2016/0042664 A1 | 2/2016 | Haberl |
| 2016/0187992 A1 | 6/2016 | Yamamoto et al. |
| 2017/0072850 A1* | 3/2017 | Curtis ............... B60W 50/0097 |
| 2017/0301260 A1* | 10/2017 | Gussen .................... G09B 5/02 |
| 2018/0033327 A1* | 2/2018 | Nishijima ........... G09B 19/167 |

* cited by examiner

VEHICLE TUTORIAL SYSTEM AND METHOD FOR SENDING VEHICLE TUTORIAL TO TUTORIAL MANAGER DEVICE

BACKGROUND

Field of the Invention

The present invention generally relates to a vehicle tutorial system and a vehicle tutorial method for sending a vehicle tutorial to a tutorial manager device when the user declines to view the tutorial at a first time so that the user can view the vehicle tutorial at a later time. More specifically, the present invention relates to a vehicle tutorial system that selects at least one vehicle tutorial, identifies a user of a vehicle, selects at least one remote device associated with the user, offers the at least one vehicle tutorial to the user at a first time on an on-board vehicle display or on the at least one remote device, and upon the user declining the offer at the first time, sends the at least one vehicle tutorial to a tutorial manager device. The tutorial manager device offers the at least one vehicle tutorial to the user at a later time on the on-board vehicle display or on the at least one remote device.

Background Information

Vehicles are often accompanied by some type of reference material, commonly a printed owner's manual that lists and describes various features and attributes of the vehicle. More recently, owner's manuals have been provided in an electronic form that offers the convenience of an electronically searchable version of the printed owner's manual. In addition, vehicle tutorials have been provided to instruct users on various features of the vehicle that may also be described in the owner's manual.

However, it is often the case that the owner's manual, whether in paper form or electronic form, and accompanying tutorials are rarely, if ever, viewed. For example, many users only consult the owner's manual or use the vehicle tutorials to diagnose a specific problem, or interpret a specific indication or warning provided by the vehicle. As such, many features of the vehicle (especially newer or more advanced features) remain unused, or if used, are used infrequently or ineffectively.

Conventional vehicle tutorial systems provide a vehicle tutorial to a user via an interface inside the vehicle. For example, some conventional vehicle tutorial systems select a certain area of improvement for a driver and provide a tutorial message to the driver when a certain driving situation is identified. These conventional systems are integrated into the vehicle and provide tutorial messages to a driver within the vehicle. Additional conventional vehicle tutorial systems refrain from providing a tutorial notification to a driver while the car is in motion and instead present the tutorial notification to the driver at an appropriate time, such as when the car is stopped.

SUMMARY

It has been discovered that in order to improve the frequency and effectiveness with which certain features of a vehicle are used, an improved vehicle tutorial system is needed.

In particular, users of vehicles are often busy and do not have time to view a vehicle tutorial inside a vehicle or cannot pay attention to the tutorial while they are driving. For example, if a vehicle proactively offers a user a certain tutorial based on certain data, the user may decline the tutorial or ignore the message if he or she is busy or the vehicle is in motion. In that case, the user may not ever view the tutorial and learn about certain features of the vehicle. Therefore, it is desirable for a vehicle tutorial system to offer the user a vehicle tutorial and, if the user declines or ignores the tutorial, offer the tutorial again to the user at a later time, either in the vehicle or on a device associated with the user, such as a cellular phone or a computer.

In view of the state of the known technology, one aspect of the present disclosure is to provide a vehicle tutorial system. The vehicle tutorial system includes a data storage device, an on-board identification sensor for identifying a user of a vehicle, an on-board vehicle communication device, a tutorial manager device and an on-board vehicle controller. The data storage device has at least one vehicle tutorial stored therein. The on-board vehicle communication device is configured to communicate with the tutorial manager device and at least one remote device. The tutorial manager device is located in at least one of a cloud computer and the at least one remote device. The on-board vehicle controller is programmed to: identify the user of the vehicle based on information from the on-board identification sensor, select the at least one vehicle tutorial, select the at least one remote device associated with the user of the vehicle, offer the at least one vehicle tutorial to the user at a first time on at least one of an on-board vehicle display and the at least one remote device, and upon the user declining the offer at the first time, send the at least one vehicle tutorial to the tutorial manager device. The tutorial manager device includes a processor programmed to offer the at least one vehicle tutorial to the user at a time later than the first time on the on-board vehicle display or on the at least one remote device.

Another aspect of the present disclosure is to provide a vehicle tutorial method. The vehicle tutorial method includes identifying a user of a vehicle, selecting at least one vehicle tutorial, selecting at least one remote device associated with the user, offering the at least one vehicle tutorial to the user at a first time, upon the user declining the at least one vehicle tutorial at the first time, sending the at least one vehicle tutorial to a tutorial manager device, and offering the at least one vehicle tutorial to the user at a time later than the first time on the on-board vehicle display or on the at least one remote device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
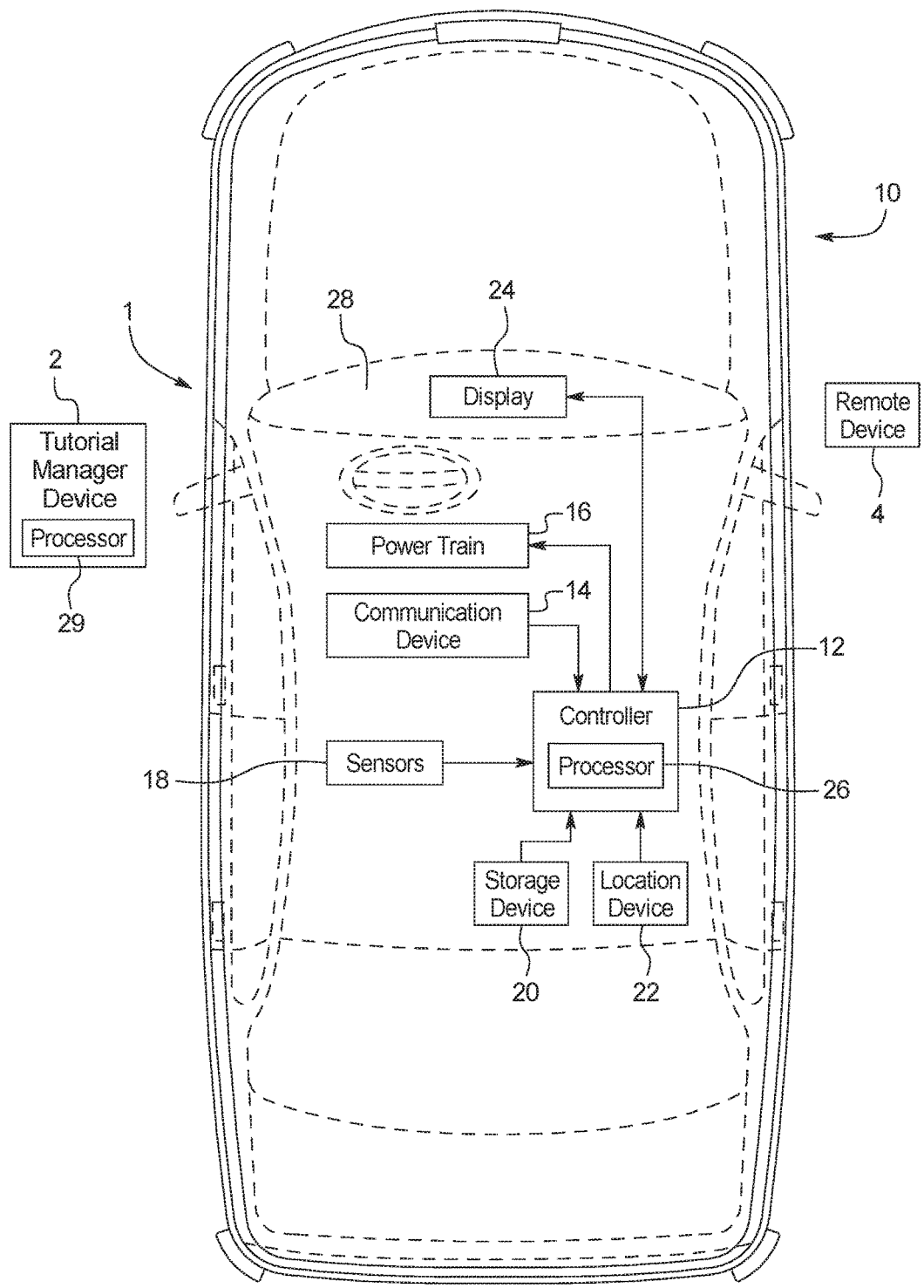
FIG. 1 is a schematic view of a vehicle tutorial system including a vehicle in which portions of the vehicle tutorial system may be implemented according to one embodiment.

Referring initially to FIG. 1, a vehicle tutorial system 1 is illustrated that includes a tutorial manager device 2, a remote device 4 and a vehicle 10 in accordance with a first embodiment. The vehicle 10 is equipped to be part of the vehicle tutorial system 1. The vehicle 10 can be an autonomous vehicle or any other suitable vehicle. The vehicle tutorial system 1 includes at least one vehicle tutorial that may be offered to a user and sent to the tutorial manager device 2 for later viewing if the user declines the at least one vehicle tutorial.

As shown in FIG. 1, the vehicle 10 includes a controller 12 that is in communication with a communication device 14, a powertrain 16, a plurality of vehicle sensors 18, a data storage device 20, a location device 22 and a display 24. The controller 12 is also in communication with the tutorial manager device 2 and the remote device 4. The controller 12 is a vehicle-mounted device that communicates with other components of the vehicle 10 and with the tutorial manager device 2 to identify a user of the vehicle 10, offer the user of the vehicle 10 a selected tutorial from among a plurality of vehicle tutorials and, if the user declines or ignores the selected tutorial, send the selected tutorial to the tutorial manager device 2 for later viewing of the tutorial by the user on the remote device 4 or in the vehicle 10. The tutorials are prestored in the data storage device 20 of the vehicle 10 or in a memory of the tutorial manager device 2.

The controller 12 includes a processor 26 with a control program that controls a portion of the vehicle tutorial system 1 as discussed below. The processor 26 can be part of a microcomputer. The controller 12 can also include other conventional components such as an input interface circuit, an output interface circuit, and storage devices, such as a ROM (Read Only Memory) device and a RAM (Random Access Memory) device. The processor 26 is programmed to control one or more of the communication device 14, the powertrain 16, the data storage device 20 and the display 24, and to make determinations or decisions, as discussed herein. The memory circuit stores processing results and control programs that are run by the processor circuit, such as processing results and control programs for the communication device 14, the powertrain 16, the data storage device 20, the display 24 and the electrical systems of the vehicle that are necessary or desired for presentation of the vehicle tutorial to the user and sending the vehicle tutorial to the tutorial manager device 2. The controller 12 is operatively coupled to the communication device 14, the powertrain 16, the vehicle sensors 18, the data storage device 20, the location device 22 and the display 24 in a conventional manner, as well as other electrical systems in the vehicle, such as the turn signals, windshield wipers, lights, any system or device necessary or desired for presentation of a vehicle tutorial on various features of the vehicle 10, such as a remote auto parking feature, and any other suitable systems. Such a connection enables the controller 12 to monitor and control any of these systems as desired. The internal RAM of the controller 12 stores statuses of operational flags and various control data. The internal ROM of the controller 12 stores the information for various operations. The controller 12 is capable of selectively controlling any of the components of the vehicle tutorial system 1 that are located within the vehicle 10 in accordance with the control program to present the selected vehicle tutorial to the user. It will be apparent to those skilled in the art from this disclosure that the precise structure and algorithms for the controller 12 can be any combination of hardware and software that will carry out the functions of the present invention.

The communication device 14 of vehicle 10 is configured to communicate wirelessly over one or more communication paths. Examples of communication paths include a cellular telephone network, a wireless network (WiFi or a WiMAX), a DSRC (Dedicated Short-Range Communications) network, a cloud network, a power line communication network, etc. The communication device 14 is preferably configured to receive information from the controller 12 and to transmit such information to the tutorial manager device 2 or to the remote device 4 associated with the user as described in further detail below with reference to FIG. 2. For example, the communication device 24 can be configured to wirelessly transmit a tutorial selected by the controller 12 to the tutorial manager device 2 so that the tutorial can be presented to the user at a later time on the display 24 of the vehicle 10 or on the remote device 4.

The communication device 14 is also configured to receive information from the tutorial manager device 2 and the remote device 4 and to transmit such information to the controller 12. For example, the communication device 14 can be configured to wirelessly receive a selected tutorial from the tutorial manager device 2 and transmit the selected tutorial to the controller 12 so that the selected tutorial can be viewed on the display 24 of the vehicle. The communication device 14 can also be configured to wirelessly receive a selected tutorial from the tutorial manager device 2 and transmit the selected tutorial to the remote device 4 so that the selected tutorial can be viewed on the remote device 4.

The powertrain 16 may include a power source, a transmission, a steering unit, an actuator, or any other element or combination of elements of a powertrain, including a suspension, a drive shaft, axles, wheels or an exhaust system. The controller 12 may receive power from the powertrain and may communicate with the powertrain 16 to control the vehicle 10, which may include accelerating, decelerating, steering or otherwise controlling the vehicle 10.

The vehicle sensors 18 are configured to identify a user of the vehicle 10. For example, the vehicle sensors 18 are preferably mounted inside the vehicle 10 and are configured to identify the user via a signal received from a smart key. However, the vehicle sensors 18 can be mounted on any suitable internal or external portion of the vehicle 10 or otherwise disposed in any position on or with respect to the vehicle 10 and can include any type and/or combination of sensors to enable identification of the user of the vehicle 10. In addition, the vehicle sensors 18 can be cameras, radar sensors, photo sensors or any combination thereof. Furthermore, there can be as few or as many sensors as is desirable or suitable.

Although the vehicle sensors 18 preferably are electronic detection devices that are configured to identify the user via a signal received from a smart key, the vehicle sensors 18 can be any suitable sensors that are configured to receive identifying information about a user of the vehicle. For example, the vehicle sensors 18 can include a biometric sensor configured to identify a user via a fingerprint or a camera configured to identify a user via an image of the user in combination with facial recognition software. The vehicle sensors 18 are in communication with the controller 12 and are capable of transmitting information to the controller 12. Therefore, the controller 12 can determine an identity of the user based on the identifying information received from the vehicle sensors 18.

The vehicle sensors 18 can also include additional sensors that are not configured to detect identifying information regarding a user, including sensors for detecting remote objects such as pedestrians or remote vehicles.

As shown in FIG. 1, the data storage device 20 is in communication with the controller 12. The data storage device 20 can store information such as a plurality of vehicle tutorials describing various features of the vehicle 10. The data storage device 20 can also store information such as data regarding how many times various users have used certain features of the vehicle 10, how many times, if any, a particular user has viewed certain portions of the owner's manual or vehicle tutorials corresponding to those portions of the owner's manual, and whether or not a particular user has asked questions regarding a certain vehicle tutorial. The data storage device 20 can also store information indicating that a user has performed a particular task without using a feature that could aid in performing that task. For example, the data storage device 20 can store information indicating that a particular user was driving on the highway but did not use cruise control, or information indicating that the user had parallel parked the vehicle 10 but did not use the automatic parallel park feature. The data storage device 20 can also store information indicating whether a particular user wanted to be periodically offered a lot of tutorials, some tutorials or no tutorials. Alternatively, the user can set up a schedule of tutorials on the remote device 4 or in the vehicle 10 and the schedule of tutorials can be cued in the tutorial manager device 2.

Thus, in selecting a vehicle tutorial to offer to a user using any of the herein described methods, devices or systems, the controller 12 can determine whether a particular feature of the vehicle 10 is relevant to a current driving situation and can review the data regarding whether or not the user has ever used that feature to determine whether to offer the user a vehicle tutorial on that feature. Furthermore, in selecting a vehicle tutorial to offer to a user using any of the herein described methods, devices or systems, the controller 12 can determine whether a particular feature of the vehicle 10 is relevant to a current driving situation and can review the data regarding whether or not a user has not viewed a vehicle tutorial on that feature to determine whether to offer the user a vehicle tutorial on that feature.

Moreover, as illustrated in FIG. 1, the location device 22 is in communication with the controller 12. In the illustrated embodiment, the location device 22 is a GPS tracker and the vehicle 10 receives a GPS satellite signal from the location device 22. In a conventional manner, the location device 22 obtains the GPS satellite signal to determine positional information (such as location, speed, acceleration, yaw, and direction, just to name a few) of the vehicle 10. The location device 22 is configured to transmit such positional information regarding the vehicle 10 to the controller 12. The information from the location device 22, such as information that the vehicle 10 is on a highway, may be used by the controller 12 to determine whether to offer a user a tutorial on a certain feature. For example, the controller 12 may determine to offer a user a tutorial on cruise control based on information that the vehicle 10 is on a highway and that the user is not using the cruise control feature.

The display 24 is preferably a text display that is disposed inside the host vehicle 10 (e.g., on the console 28) so as to be capable of offering a selected tutorial to the user of the vehicle 10. Thus, the display 24 can display, in text, a question asking the user whether he or she wants to view a tutorial on a given feature and the options of "Yes," "No," or "Later." The display 24 may be a touch screen that allows the user to select the options of "Yes," No" or "Later" on the display 24 itself. Alternatively, the display 24 can work with the buttons in the vehicle 10, such as buttons for operating the radio, to allow the user to respond to the option of whether to view the tutorial and to respond to additional commands during the vehicle tutorial. The display 24 may be disposed on the console 28 or may be a heads-up display that shows text on the windshield of the vehicle 10.

The tutorial manager device 2 includes a processor 29 with a program that receives a vehicle tutorial if a user has declined to view the vehicle tutorial at an initial time and sends the vehicle tutorial to the remote device 4 or to the vehicle 10 at a later time. The processor 29 can be part of a microcomputer. The tutorial manager device 2 can be a controller that includes other conventional components such as an input interface circuit, an output interface circuit, and storage devices, such as a ROM (Read Only Memory) device and a RAM (Random Access Memory) device. The tutorial manager device 2 can be located on a cloud computer or on the remote device 4 associated with the user. The memory circuit stores processing results and control programs that are run by the processor circuit, such as processing results and control programs that are necessary or desired for receiving a vehicle tutorial and sending the vehicle tutorial to the remote device 4 or the vehicle 10. The tutorial manager device is configured to receive information wirelessly from the controller 12 of the vehicle 10. It will be apparent to those skilled in the art from this disclosure that the precise structure and algorithms for the tutorial manager device 2 can be any combination of hardware and software that will carry out the functions of the present invention.

Figure 2:
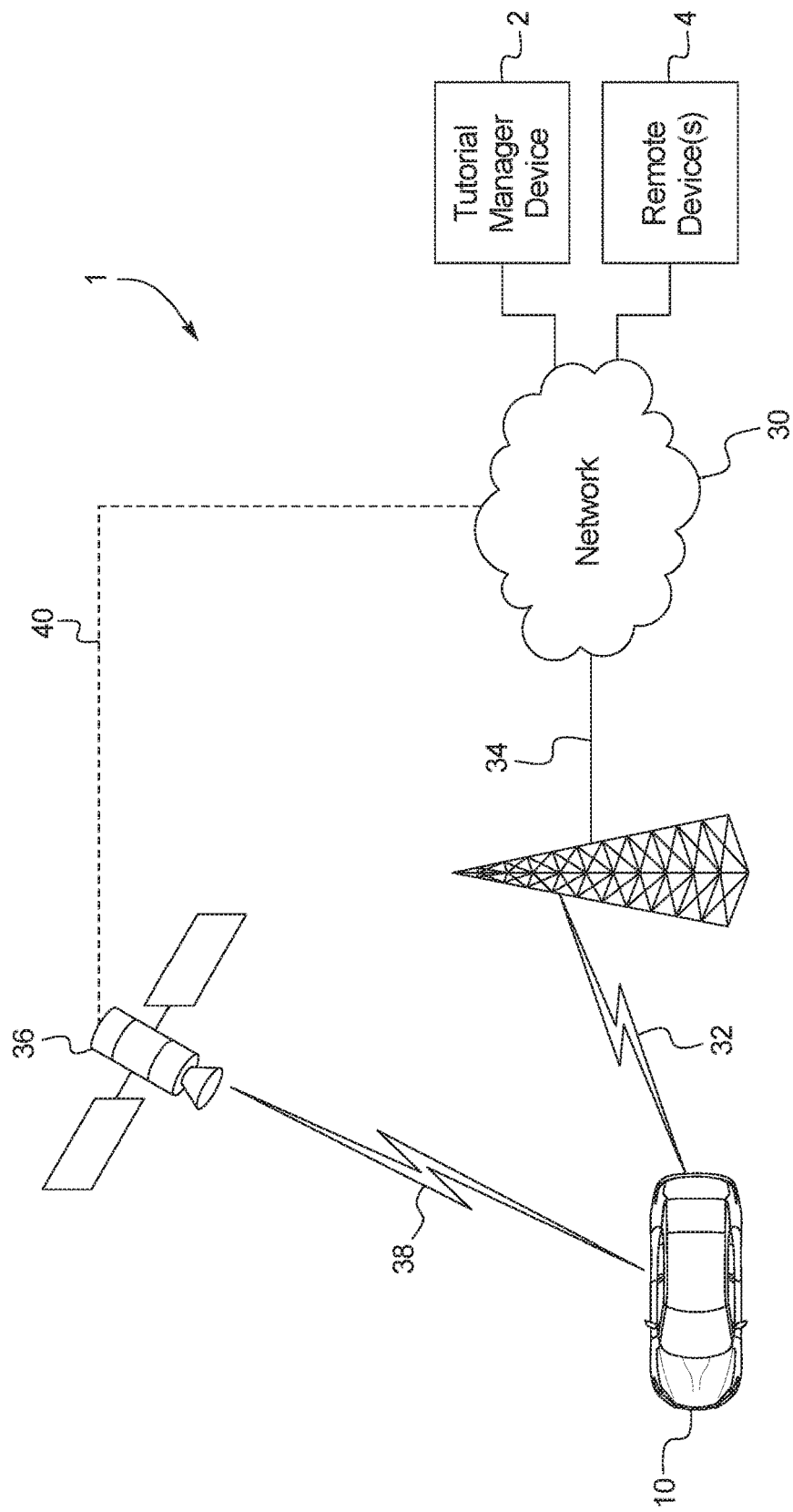
FIG. 2 is a schematic view of the vehicle tutorial system shown in FIG. 1.

As shown in FIGS. 1 and 2, the vehicle 10 includes a communication device 14 in communication with the tutorial manager device 2 and the remote device 4 through a network 30. The communication device 14 may communicate with the network 30 via wired or wireless communication links 32 and 34, or any number of wired or wireless communication links. The communication device 14 may also communicate with the network 30 via a satellite 36 or other non-terrestrial communication device. The satellite 36, which may include a computing device, may be configured to communicate with the communication device 14, with the network 30 or with the tutorial manager device 2 or the remote device 4 via communication links 38 and 40. Although only one remote device 4 is shown in FIGS. 1 and 2, it should be understood that the communication device 14 and the satellite 36 may be in communication with any number of remote devices.

The network 30 may be any type of network configured to provide for voice, data or any other type of electronic communication. For example, the network 30 may include a cloud network, a local area network (LAN), a wide area network (WAN), a cellular telephone network, a wireless network (WiFi or a WiMAX), a DSRC (Dedicated Short-Range Communications) network or a power line communication network. The network 30 may use any suitable communication protocol.

Figure 3:
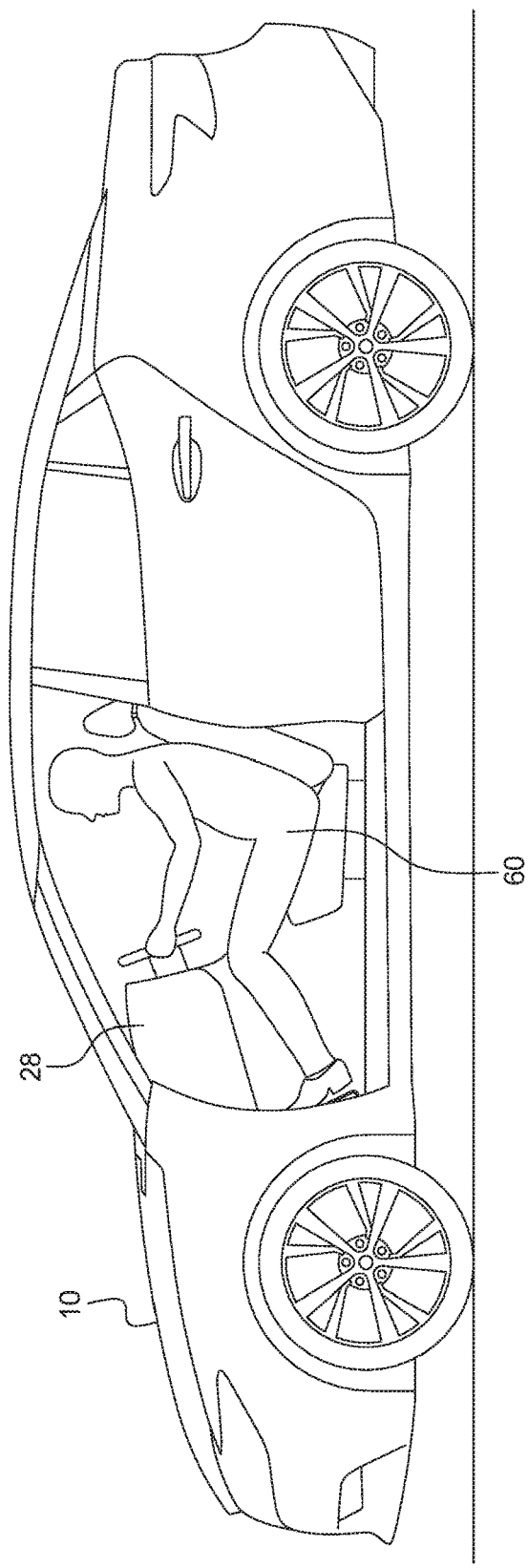
FIG. 3 is a perspective view of a user driving the vehicle shown in FIG. 1.

FIG. 3 illustrates a side view of the vehicle 10 including a console 28 and a user 60 driving the vehicle. The user 60 may be a driver of the vehicle 10 or, if the vehicle 10 is autonomous, may be a passenger that is merely using the vehicle 10. Although various users may be associated with the vehicle 10, the vehicle 10 is configured to identify the particular user 60 of the vehicle 10 based on information from the sensors 18. As discussed above, the sensors 18 are preferably configured to identify the user 60 via a signal received from a smart key but can be any suitable sensors that are configured to receive identifying information about the user 60. For example, the user 60 can be identified using a biometric sensor configured to identify a user via a fingerprint or a camera configured to identify a user via an image of the user in combination with facial recognition software.

Figure 4:
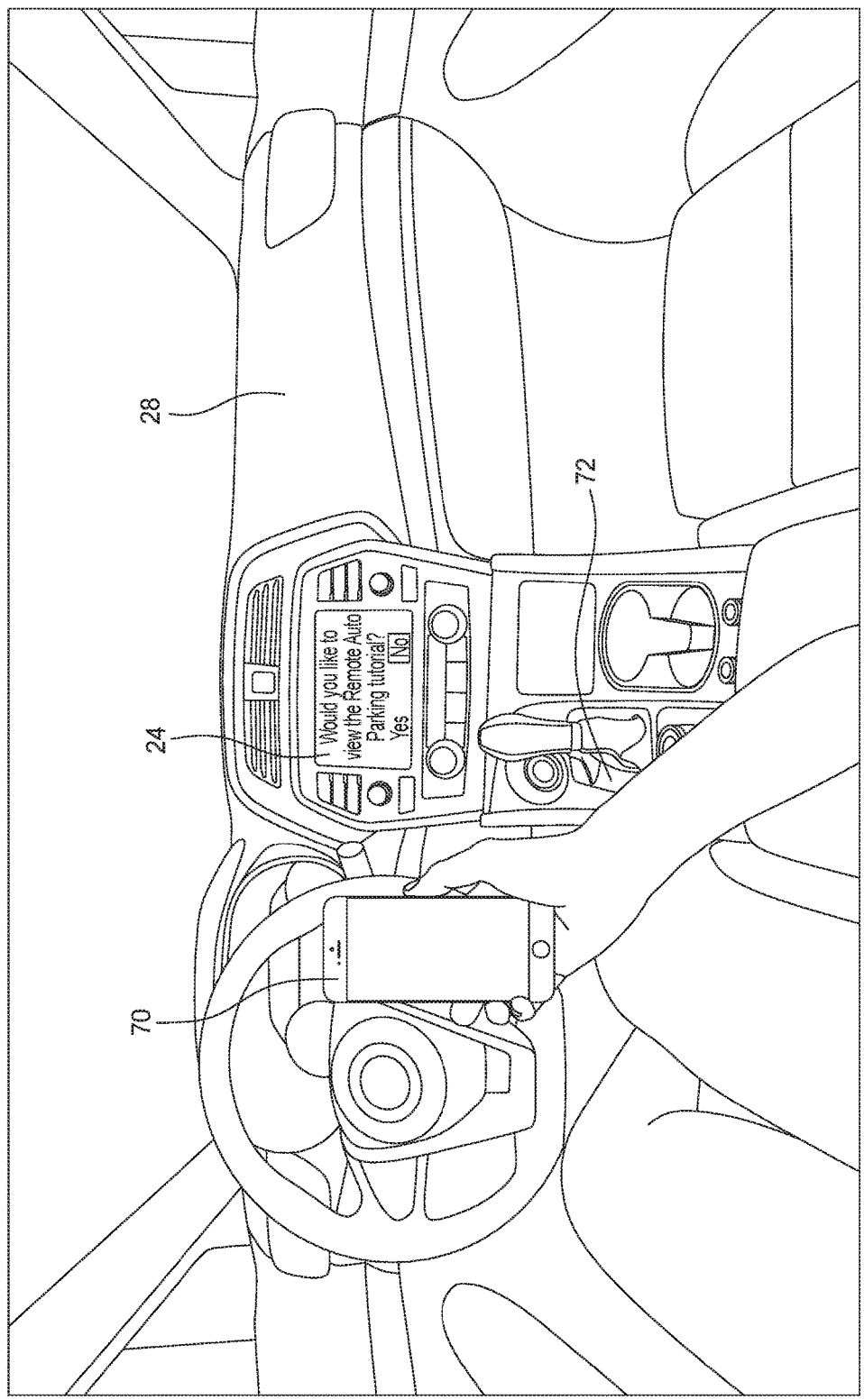
FIG. 4 is a front view of the vehicle shown in FIG. 1 in one illustrated situation.
Figure 5:
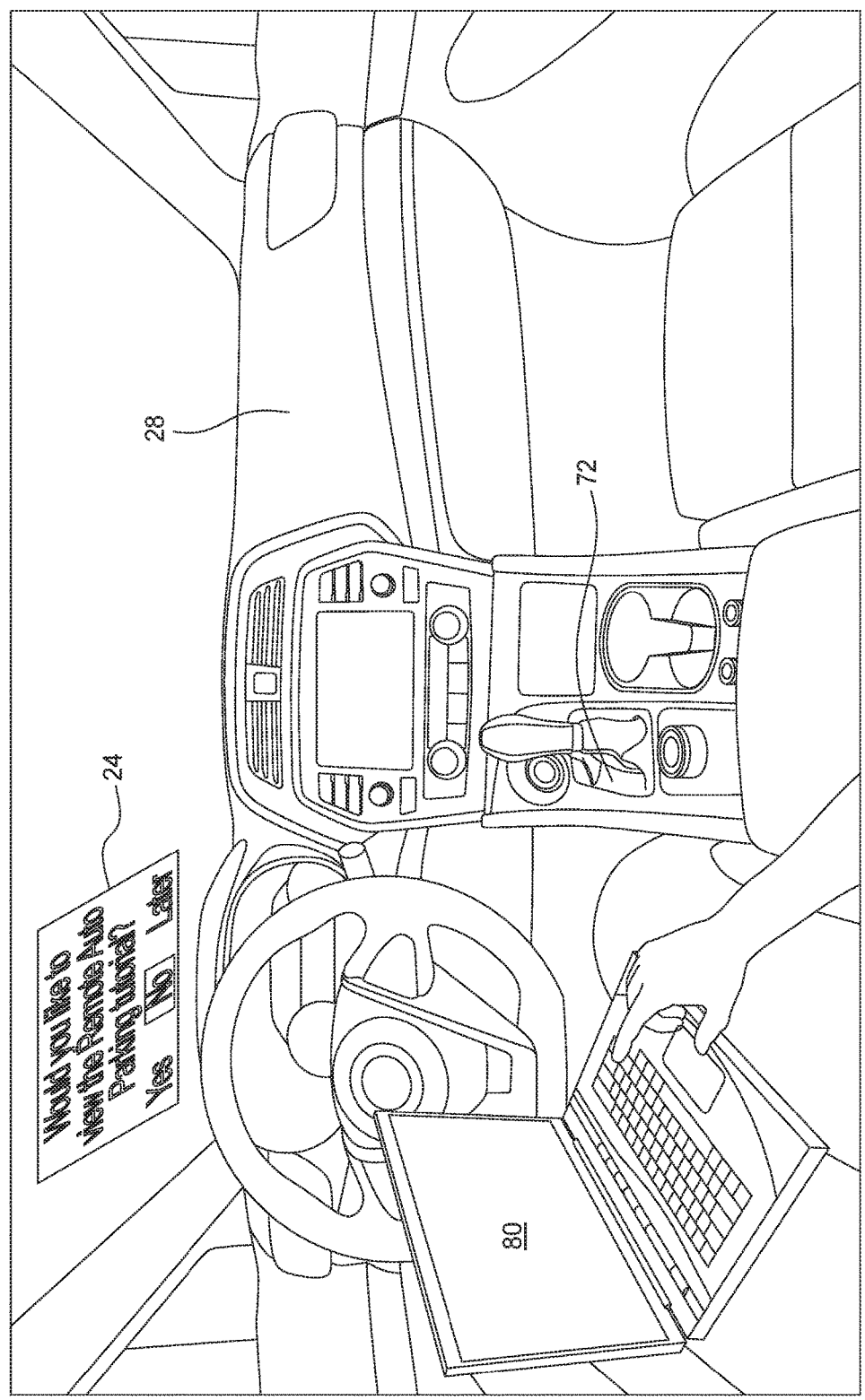
FIG. 5 is a front view of the vehicle shown in FIG. 1 in another illustrated situation.

FIGS. 4 and 5 show a vehicle tutorial being offered to the user 60 via display 24 in two illustrated situations, one with a cellular phone 70 as a remote device, and the other with a laptop computer 80 as a remote device. In FIG. 4, the user 60 is being offered the Remote Auto Parking tutorial on the display 24 located in the console 28 of the vehicle 10. The vehicle 10 also detects a cellular phone 70 as the remote device associated with the user 60. As shown in FIG. 4, the user 60 has selected "No" in response to being offered the tutorial. Therefore, the Remote Auto Parking tutorial is sent to the tutorial manager device 2 as shown in FIGS. 1 and 2, and the user 60 will be offered the Remote Auto Parking tutorial at a later time, either on the cellular phone 70 or the display 24.

Alternatively, if the user selects "Yes" to accept the tutorial, either at the first time or at the later time, the tutorial is displayed on the cellular phone 70 and/or the display 24. For example, the first five steps of the tutorial can be viewed on the display 24 and the last five steps of the tutorial can be viewed on the cellular phone 70. While the tutorial is displayed on the cellular phone 70 and/or the display 24, the tutorial may provide instructions and/or the vehicle 10 may provide visual feedback, audio feedback and/or haptic feedback as each step of the tutorial is displayed. For example, while the Remote Auto Parking tutorial is being displayed on the display 24, the vehicle tutorial may provide instructions on the display 24 or the cellular phone 70 and ask the user to press buttons while viewing the tutorial. The tutorial is configured to wait for the user to respond to the instructions.

The vehicle 10 may also provide lights synced with the tutorial to play in sequence with the various steps of the tutorial to highlight the buttons or aspects of the vehicle 10 that are being used in the tutorial. For example, while the Remote Auto Parking tutorial is displayed on the display 24, the vehicle 10 may light up the PRNDL gear shifter 72 to walk the user 60 through the tutorial. The vehicle may also provide auditory cues such as beeping noises or other noises to draw the attention of the user 60 toward a certain button or aspect of the vehicle as the tutorial is being displayed. Similarly, the vehicle 10 may provide haptic feedback to provide the user with a "feeling" when a certain aspect of the vehicle 10 is being shown in the tutorial. For example, if the tutorial is describing putting pressure on the brakes of the vehicle 10, the vehicle 10 can provide a braking sensation to the user when that aspect of the tutorial is being displayed.

FIG. 5 is similar to FIG. 4, except that the remote device in FIG. 5 is a laptop computer 80 rather than a cellular phone 70, and the display 24 is a heads-up display rather than a display located in the console 28. As with FIG. 4, the user 60 is being offered the Remote Auto Parking tutorial on the display 24 of the vehicle 10. The vehicle 10 detects a laptop computer 80 as the remote device associated with the user 60. The user 60 has selected "No" in response to being offered the tutorial. Therefore, the Remote Auto Parking tutorial is sent to the tutorial manager device 2 as shown in FIGS. 1 and 2, and the user 60 will be offered the Remote Auto Parking tutorial at a later time, either on the laptop computer 80 or the display 24.

Alternatively, if the user selects "Yes" to accept the tutorial, either at the first time or at the later time, the tutorial is displayed on either the laptop computer 80 or the display 24. Furthermore, while the tutorial is displayed on either the laptop computer 80 or the display 24, the tutorial may provide instructions and/or the vehicle 10 may provide visual feedback, audio feedback and/or haptic feedback as each step of the tutorial is displayed as discussed above.

Figure 6:
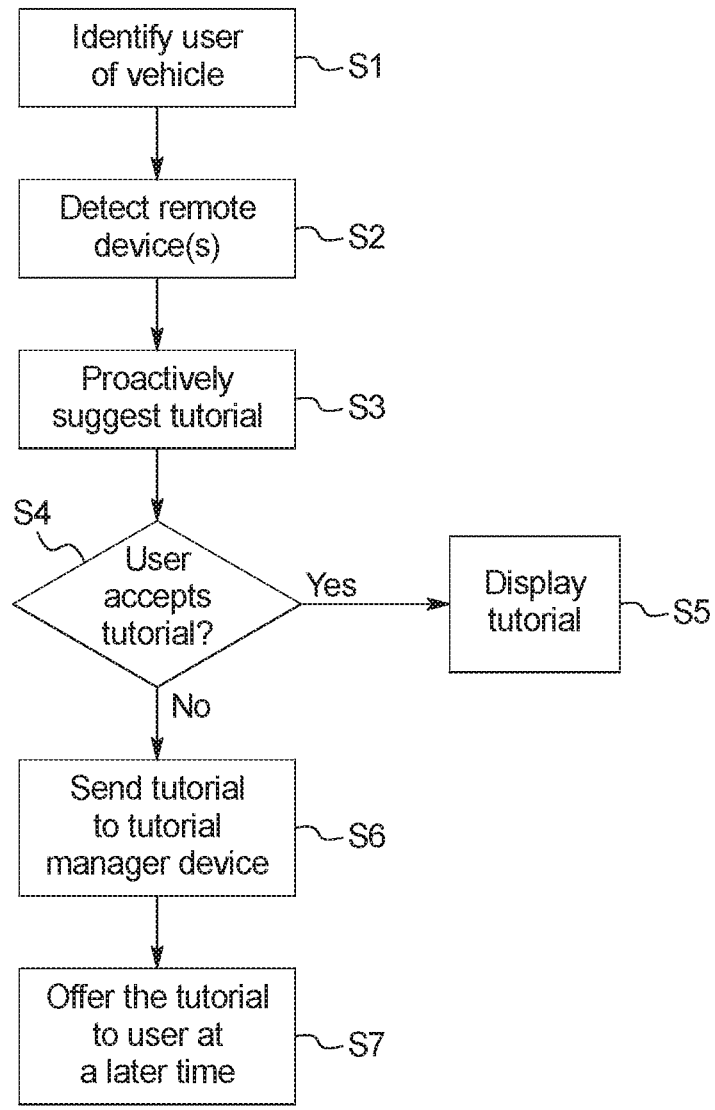
FIG. 6 is a flow chart illustrating a vehicle tutorial method executed by the vehicle tutorial system shown in FIG. 1 in one illustrated situation.

FIG. 6 illustrates a vehicle tutorial method for the vehicle tutorial system 1 of FIGS. 1 and 2. As shown in step S1, the method includes identifying a user of the vehicle 10. As discussed above, the vehicle 10 may include sensors 18 that are configured to identify the user of the vehicle 10 in any suitable manner. For example, the sensors 18 are configured to identify a user via a signal received from a smart key. The vehicle 10 can also identify a user via a biometric sensor configured to identify a user via a fingerprint or a camera configured to identify a user via an image of the user in combination with facial recognition software. As discussed above, the data obtained from the sensors 18 may be transmitted to the controller 12 so that the controller 12 can determine an identity of the user based on the identifying information received from the vehicle sensors 18.

In step S2, the vehicle 10 detects one or more remote devices associated with the user. For example, the vehicle 10 may detect a remote device associated with a user if the user has registered a cellular phone number, an email address or an IP address associated with the remote device and the vehicle 10 has access to the registered information associated with the user. For example, the data storage device 20 of the vehicle 10 can include remote device information that the user enters via the display or a graphical user interface in the vehicle 10. The remote device information can be information, such as a cellular phone number or an IP address, that allows the vehicle 10 to associate the remote device with the user. The vehicle 10 may detect the remote device via a sensor configured to detect that a device has been plugged into the vehicle and the controller 12 configured to detect that the remote device is associated with the particular user identified in step S1. The controller 12 is configured to detect the remote device associated with the identified user.

In step S3, the vehicle 10 then proactively suggests or offers the user a tutorial based on the identity of the user determined in step S1 and the data stored in data storage device 20. For example, the controller 12 can select a tutorial from among a plurality of tutorials based on information stored in the data storage device 20 regarding the identified user. Specifically, the controller 12 can receive information that the user has not had training on a certain feature, such as cruise control, or has not read the portion of the electronic owner's manual related to the cruise control feature. The controller 12 can then select a tutorial related to the cruise control feature and offer the selected tutorial to the user on the display 24 and/or on the remote device detected in step S2. The controller 12 can also receive information that the user has not ever used a certain feature, such as the automatic parallel park feature, and can also receive information that the automatic parallel park feature may be relevant to the user's current driving situation. The controller 12 can then select a tutorial related to the automatic parallel park feature and offer the selected tutorial to the user on the display 24 and/or on the remote device detected in step S2.

The controller 12 can also receive information indicating the number of times that the user has used a certain feature. The controller 12 can then determine the user's level of expertise with the feature based on the number of times that the user has used the feature. For example, if the controller 12 receives information that the user has only used the automatic parallel park feature three times, the controller 12 can determine that the user is a novice and select a novice-level tutorial associated with the automatic parallel park feature. The controller 12 can then select a tutorial related to the automatic parallel park feature and offer the selected tutorial to the user on the display 24 and/or on the remote device.

The controller 12 can also receive information indicating that the identified user had encountered a certain driving situation but did not use a feature that would have been helpful in such a situation. For example, the controller 12 can receive information that the user was driving on the highway but did not use cruise control. The controller 12 can also receive information indicating that the identified user wanted to be offered a tutorial on cruise control. The controller 12 can then select a tutorial related to the cruise control feature and offer the selected tutorial to the user on the display 24 and/or on the remote device detected in step S2.

In step S4, the vehicle 10 determines whether the user has accepted the tutorial offered in step S3. If the controller 12 determines that the user has accepted the tutorial, the method proceeds to step S5 and the controller 12 controls the display 24 to display the tutorial or communicates with the remote device detected in step S2 to display the tutorial on the remote device.

However, if the user does not accept the tutorial, for example by ignoring the tutorial offering, selecting "No" or selecting "Later," the method proceeds to step S6 and the tutorial is sent to the tutorial manager device 2 shown in FIGS. 1 and 2. For example, as discussed above, the tutorial manager device 2 can include a processor 29 with a program that receives a vehicle tutorial if a user has declined to view the vehicle tutorial at an initial time. The tutorial manager device 2 can be located on a cloud computer or on the remote device. The tutorial manager device 2 is configured to receive the tutorial from the vehicle 10 in step S6.

In step S7, the tutorial manager device is configured to send the vehicle tutorial to the remote device detected in step S2 or back to the vehicle 10 to offer to the user at a subsequent time. For example, if a user responds "Later" when offered the tutorial in step S3, the controller 12 controls the communication device 14 to send the tutorial to the tutorial manager device 2. The tutorial manager device 2 can include a memory for storing the tutorial and can be configured to offer the tutorial to the user at a subsequent time on the display 24 of the vehicle 10 or on the remote device detected in step S2. For example, the tutorial manager device can be configured to receive information about the user from the vehicle 10 and to offer the tutorial to the user at a certain time of day that is likely to be convenient for the user, such as at 5:00 pm if the user has working hours of 9:00 am-5:00 pm. The information about a convenient time of day for the user can be provided by the user or set to a predetermined time of day in advance. Alternatively, the tutorial manager device can be configured to use a cell phone accelerometer to determine when the user has stopped walking for 5-10 minutes and to offer the tutorial to the user after that time.

Figure 7:
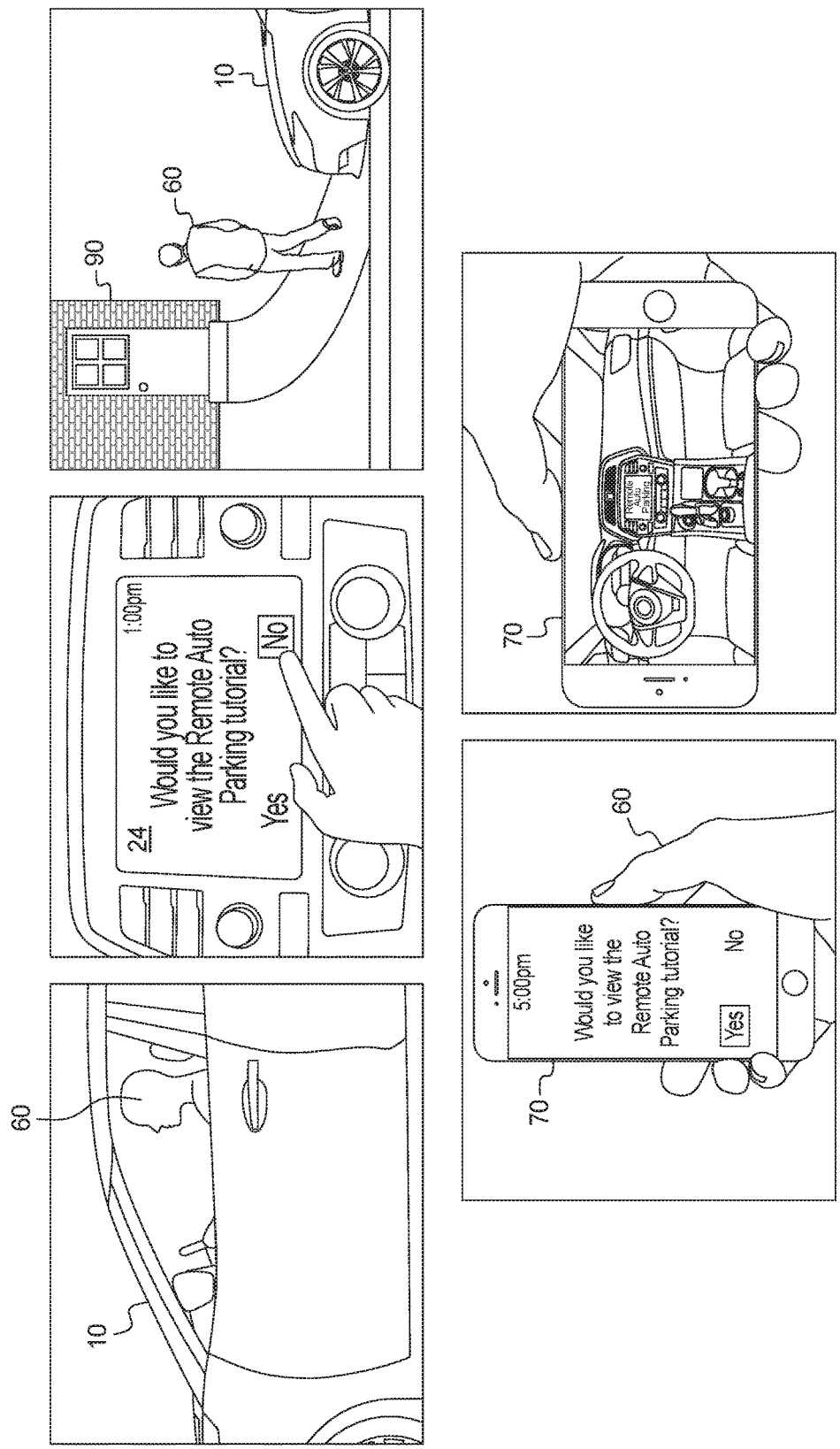
FIG. 7 is an illustrated flow chart showing a vehicle tutorial method executed by the vehicle tutorial system shown in FIG. 1 in one illustrated situation.

FIG. 7 illustrates an operation of the vehicle tutorial system of FIG. 1 in one illustrated situation. As shown in FIG. 7, a user 60 is about to parallel park using the vehicle 10 in the first image. The controller 12 can detect that the driving situation is such that the parallel parking feature may be useful. The controller 12 can also receive information from the data storage device 20 indicating that the user has not previously used the automatic parallel park feature.

Then, in the second image, the display 24 offers the user the remote auto parking tutorial by displaying text saying "Would you like to view the Remote Auto Parking tutorial?" and showing "Yes" and "No" on the display. As shown in the image, the "No" choice has been selected by the user 60 and the clock on the display 24 shows a time of 1:00 pm.

In the third image, after the user has parked and exited the vehicle 10, the user 60 walks into a house 90.

As shown in the fourth image, at a time of 5:00 pm later that day, while the user 60 is sitting down and looking at his or her cell phone 70, the cell phone 70 displays the message "Would you like to view the Remote Auto Parking tutorial?" As shown in the image, the user 60 has selected the "Yes" choice to display the tutorial.

In the fifth image, the Remote Auto Parking tutorial is displayed on the cell phone 70.

The vehicle tutorial system 1 described herein offers a user a vehicle tutorial and, if the user declines or ignores the tutorial, offer the tutorial again to the user at a later time, either in the vehicle or on a device associated with the user, such as a cellular phone or a computer. Alternatively, the user may decline the tutorial by not accepting in a time period of 10-30 seconds or by turning off the vehicle. Therefore, users can view the tutorials at a more convenient time and place and, thus, the system can better ensure that users view vehicle tutorials, thereby improving the frequency and effectiveness with which certain features of a vehicle are used.

The data storage device 20 and the location device 22 are conventional components that are well known in the art. Since data storage devices and location devices are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "vehicle tutorial" as used herein refers to any electronic media that may enable a user to view an electronic vehicle tutorial, such as a video that may be displayed on a display or a remote device such as a cellular phone or a computing device, as well as a link to a video or other file that enables a user to view the electronic vehicle tutorial.

The term "remote device" as used herein refers to any device that can be transported or otherwise present outside of a vehicle and is capable of displaying a vehicle tutorial. The term "remote device" as used herein expressly includes a mobile device such as a cellular phone, a tablet and a laptop computer, as well as any computing device that is external to the vehicle, such as a desktop computer.

The term "controller" as used herein refers to a component, a device or a group of devices that directs or controls the operation of a vehicle, and does not include a person.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts. Also as used herein to describe the above embodiments, the following directional terms "forward," "rearward," and "above," as well as any other similar directional terms refer to those directions of a vehicle equipped with the vehicle state indication system. Accordingly, these terms, as utilized to describe the present invention should be interpreted relative to a vehicle equipped with the vehicle control system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle tutorial system comprising:
a data storage device having at least one vehicle tutorial stored therein;
an on-board identification sensor for identifying a user of a vehicle;
an on-board vehicle communication device configured to communicate with a tutorial manager device and at least one remote device;
a tutorial manager device located in at least one of a cloud computer and the at least one remote device; and
an on-board vehicle controller programmed to:
select the at least one vehicle tutorial,
identify the user of the vehicle based on information from the on-board identification sensor,
select the at least one remote device associated with the user of the vehicle,
offer the at least one vehicle tutorial to the user at a first time on at least one of an on-board vehicle display and the at least one remote device, and
upon the user declining the offer at the first time, send the at least one vehicle tutorial to the tutorial manager device,
the tutorial manager device including a processor programmed to offer the at least one vehicle tutorial to the user at a time later than the first time on the on-board vehicle display or on the at least one remote device.

2. The vehicle tutorial system according to claim 1, wherein
the at least one vehicle tutorial includes a plurality of vehicle tutorials stored in the data storage device.

3. The vehicle tutorial system according to claim 2, wherein
the controller is further programmed to select one of the vehicle tutorials as a selected vehicle tutorial based on at least one of a driving situation, a user identity, and information stored in the data storage device.

4. The vehicle tutorial system according to claim 3, wherein
the controller is further programmed to select the vehicle tutorial based on the user identity and a determination that the user has not previously viewed the selected vehicle tutorial.

5. The vehicle tutorial system according to claim 3, wherein
the controller is further programmed to select the vehicle tutorial based on the user identity and a number of times that the user has used a feature associated with the selected vehicle tutorial.

6. The vehicle tutorial system according to claim 3, wherein
the controller is further programmed to determine the driving situation based on information detected by at least one on-board vehicle sensor and to select the selected vehicle tutorial based on the driving situation.

7. The vehicle tutorial system according to claim 1, wherein
the on-board vehicle display includes at least one of a heads-up display and a vehicle console display.

8. The vehicle tutorial system according to claim 1, wherein
the at least one remote device includes at least one of a cellular phone, a tablet, a laptop computer and a desktop computer.

9. The vehicle tutorial system according to claim 1, wherein
the controller is programmed to associate the at least one remote device with the user of the vehicle based on a user identity stored in the data storage device.

10. The vehicle tutorial system according to claim 1, wherein
the on-board vehicle communication device is configured to communicate with the tutorial manager device through at least one of a wireless communication link and a wired communication link.

11. The vehicle tutorial system according to claim 1, further comprising
a user interface operatively communicating with the controller, and
the controller being programmed to offer the at least one vehicle tutorial to a user at the first time in response to an input via the user interface.

12. The vehicle tutorial system according to claim 1, wherein
upon acceptance of the at least one vehicle tutorial by the user, the processor is programmed to display the at least one vehicle tutorial at least partially on the at least one remote device.

13. The vehicle tutorial system according to claim 12, wherein
upon acceptance of the at least one vehicle tutorial by the user, the processor is programmed to display a first portion of the at least one vehicle tutorial on the on-board vehicle display and to display a second portion of the at least one vehicle tutorial on the at least one remote device.

14. The vehicle tutorial system according to claim 1, wherein
the controller is further programmed to provide at least one of visual feedback, auditory feedback and haptic feedback to the user while the at least one vehicle tutorial is being displayed on the on-board vehicle display.

15. A vehicle tutorial method comprising:
selecting at least one vehicle tutorial,
identifying a user of a vehicle,
selecting at least one remote device associated with the user,
offering the at least one vehicle tutorial to the user at a first time,
upon the user declining the at least one vehicle tutorial at the first time, sending the at least one vehicle tutorial to a tutorial manager device,
offering the at least one vehicle tutorial to the user at a time later than the first time on the on-board vehicle display or on the at least one remote device.

16. The vehicle tutorial method according to claim 15, wherein
the at least one vehicle tutorial is selected from among a plurality of vehicle tutorials based on at least one of a driving situation, a user identity, and information stored in a memory of the vehicle.

17. The vehicle tutorial method according to claim 16, wherein
the at least one vehicle tutorial is selected based on the user identity and a determination that the user has not previously viewed the at least one vehicle tutorial.

18. The vehicle tutorial method according to claim 16, wherein
the at least one vehicle tutorial is selected based on the user identity and a number of times that the user has used a feature associated with the at least one vehicle tutorial.

19. The vehicle tutorial method according to claim 16, wherein
the driving situation is determined based on information detected by at least one on-board vehicle sensor and the at least one vehicle tutorial is selected based on the driving situation.

20. The vehicle tutorial method according to claim 15, wherein
the at least one remote device includes at least one of a cellular phone, a tablet, a laptop computer and a desktop computer.

21. The vehicle tutorial method according to claim 15, further comprising
associating the at least one remote device with the user of the vehicle based on a user identity stored in a data storage device.

22. The vehicle tutorial method according to claim 15, wherein
the at least one vehicle tutorial is sent to the tutorial manager device through at least one of a wireless communication link and a wired communication link.

23. The vehicle tutorial method according to claim 15, wherein
the at least one vehicle tutorial is offered to the user at the first time in response to an input via a user interface.

24. The vehicle tutorial method according to claim 15, wherein
the at least one vehicle tutorial is offered to the user at the first time on at least one of an on-board vehicle display and the at least one remote device.

25. The vehicle tutorial method according to claim 15, further comprising
upon acceptance of the at least one vehicle tutorial by the user, displaying a first portion of the at least one vehicle tutorial on an on-board vehicle display and displaying a second portion of the at least one vehicle tutorial on the at least one remote device.

26. The vehicle tutorial method according to claim 25, further comprising
providing at least one of visual feedback, auditory feedback and haptic feedback to the user while the at least one vehicle tutorial is being displayed on the on-board vehicle display.

* * * * *